US012272477B2

(12) United States Patent
Miyake

(10) Patent No.: US 12,272,477 B2
(45) Date of Patent: Apr. 8, 2025

(54) INDUCTOR COMPONENT AND METHOD FOR MANUFACTURING INDUCTOR COMPONENT

(71) Applicant: Murata Manufacturing Co., Ltd., Kyoto-fu (JP)

(72) Inventor: Isamu Miyake, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 885 days.

(21) Appl. No.: 17/021,842

(22) Filed: Sep. 15, 2020

(65) Prior Publication Data

US 2021/0104345 A1 Apr. 8, 2021

(30) Foreign Application Priority Data

Oct. 8, 2019 (JP) ................................ 2019-185164

(51) Int. Cl.
*H01F 17/00* (2006.01)
*H01F 27/02* (2006.01)
*H01F 27/29* (2006.01)

(52) U.S. Cl.
CPC ....... *H01F 17/0006* (2013.01); *H01F 27/022* (2013.01); *H01F 27/292* (2013.01); *H01F 2017/0066* (2013.01)

(58) Field of Classification Search
CPC ............ H01F 17/0006; H01F 17/0013; H01F 2027/2809; H01F 27/2804; H01F 5/003;
(Continued)

(56) References Cited

U.S. PATENT DOCUMENTS 6,417,755 B1 * 7/2002 Liu ..................... H01F 17/0006 336/200
2002/0081839 A1 * 6/2002 Shimooka ......... H01L 21/76814 257/E23.161

(Continued)

FOREIGN PATENT DOCUMENTS

CN 110136921 A 8/2019
JP H02-60934 A 3/1990

(Continued)

OTHER PUBLICATIONS

An Office Action mailed by China National Intellectual Property Administration on Mar. 8, 2022, which corresponds to Chinese Patent Application No. 202011014368.5 and is related to U.S. Appl. No. 17/021,842 with English language translation.

*Primary Examiner* — Tszfung J Chan
(74) *Attorney, Agent, or Firm* — Studebaker Brackett PLLC

(57) ABSTRACT

An inductor component includes an element body having magnetism, a resin layer provided inside the element body, and inductor wirings provided inside the element body and having a contact surface that is in contact with the resin layer. A configuration ratio of the inductor wirings is equal to or less than about "0.9". In a transverse plane of the inductor wirings perpendicular to an extending direction of the inductor wirings, in a case where a largest dimension among dimensions in a height direction perpendicular to the contact surface is defined as a maximum dimension, the configuration ratio is a ratio of the largest dimension to a dimension of the contact surface in the transverse plane.

19 Claims, 6 Drawing Sheets

(58) Field of Classification Search
CPC ........... H01F 2017/0066; H01F 27/022; H01F 27/292
USPC .................................................. 336/200, 232
See application file for complete search history.

(56) References Cited

U.S. PATENT DOCUMENTS

| | | | | |
|---|---|---|---|---|
| 2004/0175569 | A1* | 9/2004 | Uchida | H01G 4/0085 428/403 |
| 2005/0195062 | A1* | 9/2005 | Yoshida | H01F 27/2804 336/200 |
| 2015/0091688 | A1* | 4/2015 | Jung | H01F 17/0006 336/200 |
| 2016/0005527 | A1* | 1/2016 | Park | C25D 5/10 336/200 |
| 2017/0287621 | A1* | 10/2017 | Seino | H01F 1/26 |
| 2018/0197672 | A1* | 7/2018 | Kim | H01F 41/041 |
| 2019/0198225 | A1* | 6/2019 | Miyoshi | H01F 27/292 |
| 2019/0244743 | A1 | 8/2019 | Hirai et al. | |
| 2020/0168386 | A1* | 5/2020 | Jung | H01F 27/255 |

FOREIGN PATENT DOCUMENTS

| | | | | | |
|---|---|---|---|---|---|
| JP | 2000323345 | A | * | 11/2000 | |
| JP | 2005210010 | A | * | 8/2005 | |
| JP | 2006066830 | A | * | 3/2006 | |
| JP | 2016006830 | A | | 1/2016 | |
| JP | 2017017141 | A | * | 1/2017 | H01F 17/0013 |
| JP | 2017034240 | A | * | 2/2017 | H01F 17/0013 |
| JP | 2017-098544 | A | | 6/2017 | |
| JP | 2017-183663 | A | | 10/2017 | |
| JP | 6508405 | B1 | * | 5/2019 | C08G 73/14 |
| JP | 2019-114606 | A | | 7/2019 | |
| JP | 2019-134141 | A | | 8/2019 | |
| KR | 2017086362 | A | * | 7/2017 | H01F 17/0013 |
| WO | 2013/021750 | A1 | | 2/2013 | |
| WO | WO-2018173920 | A1 | * | 9/2018 | C08G 73/1042 |
| WO | WO-2019163292 | A1 | * | 8/2019 | |

* cited by examiner

FIG. 12
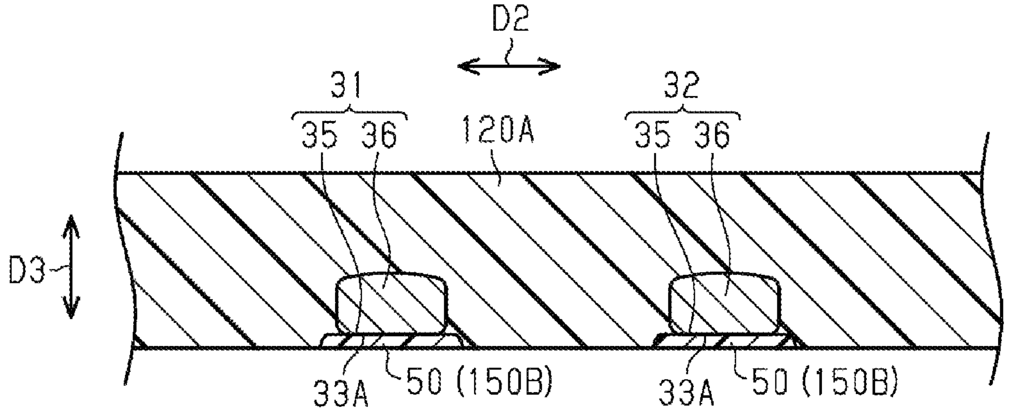
FIG. 13
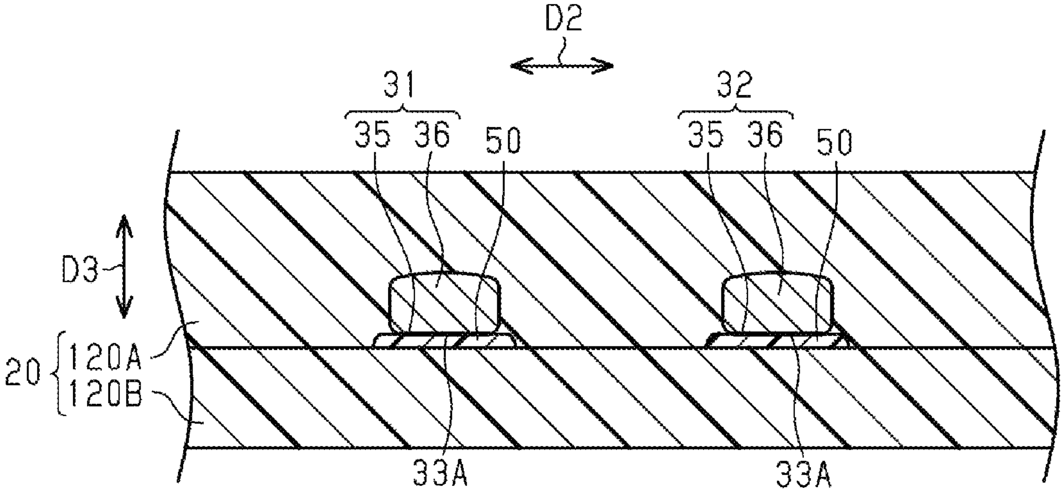
FIG. 14
| | X (μm) | Y (μm) | Z | DEVIATION OCCURRENCE RATE R (%) |
|---|---|---|---|---|
| COMPARATIVE EXAMPLE 1 | 60 | 57 | 0.95 | 32.5 |
| COMPARATIVE EXAMPLE 2 | 61 | 56 | 0.92 | 8.2 |
| EXAMPLE 1 | 61 | 55 | 0.90 | 0.9 |
| EXAMPLE 2 | 62 | 52 | 0.84 | 0.5 |
| EXAMPLE 3 | 63 | 50 | 0.79 | 0.3 |
| EXAMPLE 4 | 64 | 48 | 0.75 | 0.0 |
| EXAMPLE 5 | 69 | 34 | 0.49 | 0.0 |
| EXAMPLE 6 | 73 | 18 | 0.25 | 0.0 |

INDUCTOR COMPONENT AND METHOD FOR MANUFACTURING INDUCTOR COMPONENT

CROSS-REFERENCE TO RELATED APPLICATION

This application claims benefit of priority to Japanese Patent Application No. 2019-185164, filed Oct. 8, 2019, the entire content of which is incorporated herein by reference.

BACKGROUND

Technical Field

The present disclosure relates to an inductor component and a method for manufacturing an inductor component.

Background Art

Japanese Unexamined Patent Application Publication No. 2016-6830 describes an example of an inductor component in which a wiring is provided inside an element body having magnetism.

In the inductor component in which the wiring is provided inside the element body as described above, a position of the wiring may deviate from a design position in some cases. The design position refers to the position of the wiring defined by the design. When the position of the wiring is deviated from the set position inside the element body as described above, performance of the inductor component may change. Therefore, it is required to suppress a deviation between the position of the wiring and the design position.

SUMMARY

Accordingly, an inductor component includes an element body having magnetism, a resin layer provided inside the element body, and an inductor wiring provided inside the element body and having a contact surface that is in contact with the resin layer. In a transverse plane of the inductor wiring orthogonal to an extending direction of the inductor wiring, a largest dimension of dimensions in a height direction perpendicular to the contact surface is a maximum dimension. In this case, a configuration ratio that is a ratio of the maximum dimension to a dimension of the contact surface in the transverse plane is equal to or less than “0.9”.

In a case where a portion adjacent to the inductor wiring expands or contracts, a displacement force, which is a force for displacing the inductor wiring, may act on the inductor wiring in some cases. Such a displacement force increases as a dimension of the inductor wiring in the height direction is larger. When a close contact force, which is a force in which the inductor wiring is in close contact with the resin layer, is small, there is a possibility that a position of the inductor wiring may be changed due to the displacement force.

The inventors of the present disclosure examined the relationship between a deviation ratio between an actual position and a design position of the inductor wiring and the above-described configuration ratio, and as a result, the following knowledge has been obtained. That is, when the above-described configuration ratio is greater than about “0.9”, a deviation between the actual position and the design position is likely to occur. On the other hand, when the above configuration ratio is equal to or less than “0.9”, the deviation between the actual position and the design position is less likely to occur. By setting the configuration ratio to be equal to or less than “0.9”, it is possible to suppress an increase in the dimension in the height direction of the inductor wiring, so that the displacement force is less likely to be large. Further, since the dimension of the contact surface in the transverse plane can be increased with respect to the dimension in the height direction of the inductor wiring, it is possible to suppress reduction in the close contact force. As a result, by setting the configuration ratio to be equal to or less than “0.9”, it can be assumed that the deviation between the actual position and the design position of the inductor wiring is less likely to occur. Here, the dimension of the contact surface in the transverse plane is referred to as a “predetermined direction”.

In the above configuration, the inductor wiring is configured such that the configuration ratio is equal to or less than “0.9”. Whereby, the dimension of the inductor wiring in the predetermined direction can be increased with respect to the maximum dimension of the inductor wiring. As a result, even when the displacement force as described above acts on the inductor wiring, displacement of the inductor wiring can be suppressed in the predetermined direction due to the displacement force by an amount corresponding to the increase in the close contact force.

Also, the present disclosure provides a method for manufacturing an inductor component in which an inductor wiring is provided inside an element body having magnetism. The method includes a resin layer forming process of forming a resin layer on a substrate; a seed film forming process of forming a seed film on the resin layer; a pattern forming process of forming a wiring pattern in which a shape of the inductor wiring in the inductor component is opened by patterning a protective film on the seed film; and a conductive layer forming process of, in a case where a portion of the seed film that is not covered with the protective film is defined as a seed layer, forming a conductive layer by supplying a conductive material to the wiring pattern to form the inductor wiring by the conductive layer and the seed layer. The method further includes a protective film removing process of removing the protective film; and an element body forming process of removing at least the substrate of the substrate and the resin layer to form the element body inside which the inductor wiring is provided. In a transverse plane of the inductor wiring orthogonal to the extending direction of the inductor wiring, the largest dimension of among dimensions in the height direction perpendicular to the contact surface of the inductor wiring with the resin layer is defined as a maximum dimension. In this case, in the conductive layer forming process, the configuration ratio of the maximum dimension to the dimension of the contact surface in the transverse plane is set to be equal to or less than “0.9”.

According to the above-described configuration, the inductor wiring is formed by performing the conductive layer forming process. When the protective film is removed by the protective film removing process, the inductor wiring may receive the displacement force from the protective film. In the above configuration, the inductor wiring is formed such that the configuration ratio is equal to or less than “0.9”. Therefore, the close contact force generated between the inductor wiring and the resin layer does not decrease with respect to the displacement force received by the inductor wiring from the protective film. As a result, even when the displacement force acts on the inductor wiring from the protective film during the protective film removing process, displacement of the inductor wiring can be suppressed in the predetermined direction due to the displacement force by an amount corresponding to the increase in the close contact force.

Other features, elements, characteristics and advantages of the present disclosure will become more apparent from the following detailed description of preferred embodiments of the present disclosure with reference to the attached drawings.

BRIEF DESCRIPTION OF THE DRAWINGS

FIG. 12 is an explanatory diagram of the same manufacturing method;

FIG. 13 is an explanatory diagram of the same manufacturing method; and

FIG. 14 is a table showing comparison results between an inductor component of an example and an inductor component of a comparative example.

DETAILED DESCRIPTION

Figure 1:
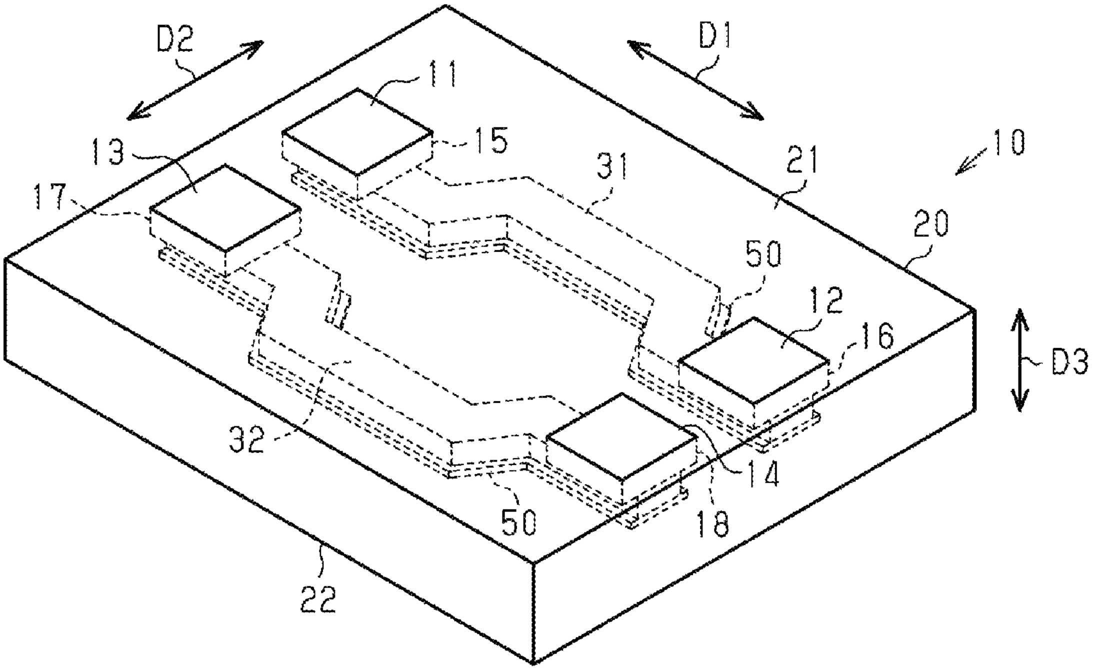
FIG. 1 is a perspective view schematically illustrating an embodiment of an inductor component.

Hereinafter, an embodiment of an inductor component and a method of manufacturing the inductor component will be described with reference to FIG. 1 to FIG. 14. Note that, constituent elements in the drawings are illustrated in an enlarged manner in some cases for ease of understanding. A dimensional ratio of the constituent elements may differ from the actual one or in another figure. In addition, hatching is given in a cross-sectional view, but hatching of some constituent elements may be omitted for ease of understanding.

Inductor Component

As illustrated in FIG. 1, an inductor component 10 includes an element body 20 formed of a magnetic material. That is, the element body 20 has magnetism. For example, the element body 20 is made of a resin containing a metal magnetic powder. Examples of the metal magnetic powder include iron, nickel, chromium, copper, and aluminum, and alloys thereof. Further, as the resin containing a metal magnetic powder, a resin material such as an epoxy resin may be used. In consideration of insulation properties and moldability, it is preferable to employ a polyimide resin, an acrylic resin, and a phenol resin as a resin containing a metal magnetic powder. Note that, it is preferable that the metal magnetic powder be contained in the element body 20 by an amount of equal to or greater than about 60 wt % with respect to the total weight. In addition, in order to improve a filling property of the resin containing the metal magnetic powder, it is more preferable that two kinds or three kinds of metal magnetic powders having different weight distributions be included in the resin.

In an example illustrated in FIG. 1, the element body 20 has a substantially rectangular parallelepiped shape. The shape of the element body 20 is not limited to a substantially rectangular parallelepiped, and may be, for example, a substantially columnar shape or a substantially polygonal shape.

In FIG. 1, an upper surface of the element body 20 is referred to as a "first main surface 21", and a lower surface of the element body 20 is referred to as a "second main surface 22". In an example illustrated in FIG. 1, the first main surface 21 has a substantially rectangular shape. In the present embodiment, a longitudinal direction of the first main surface 21 is referred to as a "first direction D1", and a short-side direction of the first main surface 21 is referred to as a "second direction D2". In addition, a direction orthogonal to both the first direction D1 and the second direction D2 is referred to as a "third direction D3". Since the first direction D1 and the second direction D2 are directions along the second main surface 22, the third direction D3 is also a direction orthogonal to the first main surface 21.

The inductor component 10 includes a plurality of external terminals provided on the first main surface 21 and a plurality of substantially columnar wirings connected to the external terminals. In the example illustrated in FIG. 1 and FIG. 2, four external terminals 11, 12, 13, and 14 are provided on the first main surface 21, and four substantially columnar wirings 15, 16, 17, and 18 are provided in the element body 20. Each of the substantially columnar wirings 15 to 18 extends in the third direction D3. Then, one ends of the substantially columnar wirings 15 to 18 are connected to the external terminals 11 to 14, respectively. On the other hand, other ends of the substantially columnar wirings 15 to 18 are located between the first main surface 21 and the second main surface 22 in the third direction D3, respectively.

Note that, in the element body 20, the external terminals 11 and 13 and the substantially columnar wirings 15 and 17 are located on a first side in the first direction D1. In the element body 20, the external terminals 12 and 14 and the substantially columnar wirings 16 and 18 are each located on a second side in the first direction D1. In addition, in the element body 20, the external terminals 11 and 12 and the substantially columnar wirings 15 and 16 are each located on a first side in the second direction D2. In the element body 20, the external terminals 13 and 14 and the substantially columnar wiring 17 and 18 are each located on a second side in the second direction D2. In FIG. 1, the external terminals 11 to 14 and the substantially columnar wirings 15 to 18 are arranged symmetrically, but the present disclosure is not limited to this arrangement, and the positions may be shifted from each other.

The inductor component 10 includes an inductor wiring provided in the element body 20. In the example illustrated in FIG. 1 and FIG. 2, two inductor wirings 31 and 32 are provided in the element body 20. The inductor wirings 31 and 32 are disposed at positions different from each other in the second direction D2. That is, the second direction D2 may be also said to be a direction in which the plurality of inductor wirings 31 and 32 is arranged. The position of the inductor wiring 31 in the third direction D3 is the same as the position of the inductor wiring 32 in the third direction D3. Of course, the position of the inductor wiring 31 in the third direction D3 may be different from the position of the inductor wiring 32 in the third direction D3.

The inductor wirings 31 and 32 connect two substantially columnar wirings disposed at positions different from each other in the first direction D1. In the example illustrated in FIG. 1 and FIG. 2, the inductor wiring 31 is connected to the substantially columnar wiring 15 and the substantially columnar wiring 16. In addition, the inductor wiring 32 is connected to the substantially columnar wiring 17 and the substantially columnar wiring 18. That is, the inductor wiring 31 is located on the first side in the second direction D2, and the inductor wiring 32 is located on the second side in the second direction D2.

The inductor wirings 31 and 32 include copper and sulfur. Specifically, the inductor wirings 31 and 32 contain copper as a main component and contains sulfur having a content of equal to or greater than about "0.01 atomic %" and equal to or less than about "1 atomic %" (i.e., from about "0.01 atomic %" to about "1 atomic %").

Figure 2:
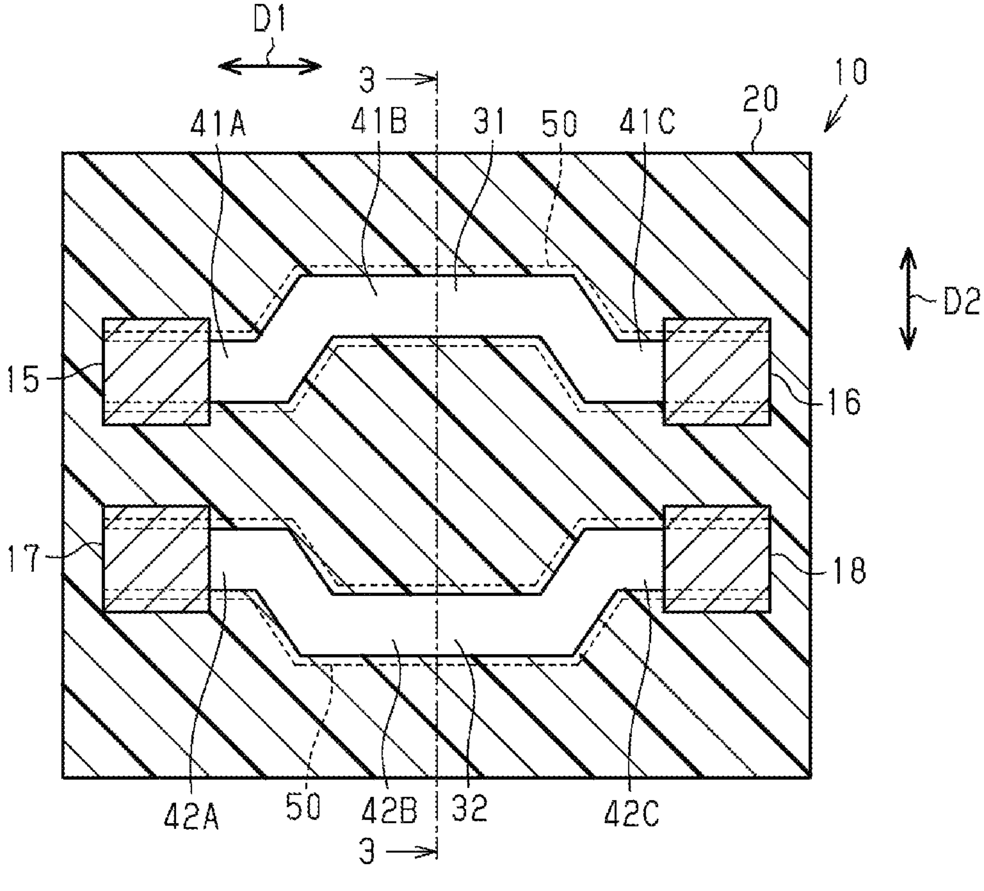
FIG. 2 is a cross-sectional view of the inductor component.
Figure 3:
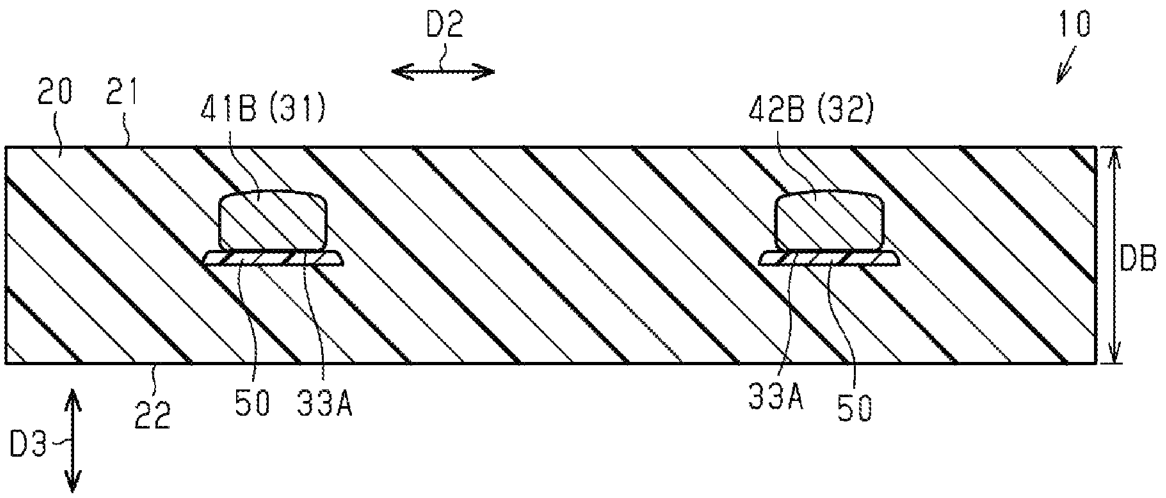
FIG. 3 is a view illustrating a cut plane of the inductor component taken along a line 3-3 in FIG. 2.

As illustrated in FIG. 2 and FIG. 3, the inductor component 10 includes a resin layer 50 provided in the element body 20. The resin layer 50 is disposed closer to the second main surface 22 side than the inductor wirings 31 and 32 in the third direction D3. Then, surfaces of the inductor wirings 31 and 32 on the second main surface 22 side in the third direction D3 is in surface contact with the resin layer 50. That is, the resin layer 50 and the inductor wirings 31 and 32 are provided in the element body 20 in a manner such that the inductor wirings 31 and 32 are stacked on the resin layer 50.

The resin layer 50 is a non-magnetic resin layer. The resin layer 50 is, for example, a polyimide resin, an acrylic resin, an epoxy resin, a phenol resin, or the like. That is, it is preferable that the resin layer 50 contains fluorine or silicon at an atomic level. By containing fluorine or silicon at the atomic level in the resin layer 50 as described above, it is possible to improve the effect of suppressing the loss of a signal at a high frequency.

In particular, in the resin layer 50, it is preferable that a content rate of fluorine or silicon at the atomic level be higher as a distance from the inductor wirings 31 and 32 in the third direction D3 is smaller That is, in the resin layer 50, it is preferable that a content rate of fluorine or silicon in a portion close to the inductor wirings 31 and 32 be higher than a content rate of fluorine or silicon in a portion away from the inductor wirings 31 and 32. By increasing the content rate of fluorine or silicon in the portion close to the inductor wirings 31 and 32 as described above, it is possible to effectively have an effect of suppressing the loss of a signal at a high frequency due to fluorine or silicon. Further, by increasing the content rate of silicon in the portion close to the inductor wirings 31 and 32, a close contact property between the resin layer 50 and the inductor wirings 31 and 32 can be increased.

As a form of fluorine contained in the resin layer 50, for example, a trifluoromethyl group may be exemplified. Note that the trifluoromethyl group may be present as a functional group in the resin, or may be present as an additive. Examples of another form of fluorine other than the trifluoromethyl group may include a difluoromethylene group, a monofluoromethylene group, a difluoromethyl group, a monofluoromethyl group, a pentafluoroethyl group, a trifluoroethyl group, a pentafluoropropyl group, a hexafluoroisopropyl group, a trifluorobutyl group, a pentafluorobutyl group, a heptafluorobutyl group, a monofluorophenyl group, a difluorophenyl group, a trifluorophenyl group, a tetrafluorophenyl group, and a hexafluorophenyl group.

As a form of the silicon contained in the resin layer 50, for example, a silsesquioxane body may be exemplified. Further, examples of the silicon-containing form other than the silsesquioxane body include a silanol group, silica, and silicone.

Next, the shape of the inductor wirings 31 and 32 will be described.

The inductor wiring 31 has a first end portion 41A connected to the substantially columnar wiring 15, a second end portion 41C connected to the substantially columnar wiring 16, and an intermediate portion 41B disposed between the first end portion 41A and the second end portion 41C in the first direction D1. The intermediate portion 41B is connected to both the first end portion 41A and the second end portion 41C. In addition, the intermediate portion 41B extends in the first direction D1. In the example illustrated in FIG. 2, the intermediate portion 41B is disposed at an outer side portion than the first end portion 41A and the second end portion 41C in the second direction D2. That is, the intermediate portion 41B is disposed on the first side relative to the first end portion 41A and the second end portion 41C in the second direction D2.

Note that the inductor wiring 31 has a substantially bent shape having three substantially linear shapes that extend parallel to the first direction D1 in each of the first end portion 41A, the intermediate portion 41B, and the second end portion 41C, and having two substantially linear shapes that connect the substantially linear shapes to each other and are oblique to the first direction D1 and the second direction D2. However, the inductor wiring 31 is not limited to such a substantially bent shape, and may have a substantially curved shape, and a part or all of the first end portion 41A, the intermediate portion 41B, and the second end portion 41C may be curved. Further, the inductor wiring 31 may have a combined shape of a substantially bent shape and a substantially curved shape.

The inductor wiring 32 has a first end portion 42A connected to the substantially columnar wiring 17, a second end portion 42C connected to the substantially columnar wiring 18, and an intermediate portion 42B disposed between the first end portion 42A and the second end portion 42C in the first direction D1. The intermediate portion 42B is connected to both the first end portion 42A and the second end portion 42C. In addition, the intermediate portion 42B extends in the first direction D1. In the example illustrated in FIG. 2, the intermediate portion 42B is disposed at an outer side portion than the first end portion 42A and the second end portion 42C in the second direction D2. That is, the intermediate portion 42B is disposed on the second side relative to the first end portion 42A and the second end portion 42C in the second direction D2.

Note that the inductor wiring 32 has a substantially bent shape having three substantially linear shapes that extend parallel to the first direction D1 in each of the first end portion 42A, the intermediate portion 42B, and the second end portion 42C, and having two substantially linear shapes that connect the substantially linear shapes to each other and are oblique to the first direction D1 and the second direction D2. However, the inductor wiring 32 is not limited to such a substantially bent shape, and may have a substantially curved shape, and a part or all of the first end portion 42A, the intermediate portion 42B, and the second end portion 42C may be curved. Further, the inductor wiring 32 may have a combined shape of a substantially bent shape and a substantially curved shape.

Incidentally, broken lines in FIG. 2 indicate the resin layer 50 located closer to the second main surface 22 side than the inductor wirings 31 and 32 in the third direction D3.

FIG. 3 is a cross-sectional view of the inductor component 10 in a case where the intermediate portions 41B and 42B of the inductor wirings 31 and 32, and the element body 20 surrounding the intermediate portions 41B and 42B. More specifically, the cross-section illustrated in FIG. 3 is a cross-section passing through the center of the element body 20 and orthogonal to a direction in which the intermediate portions 41B and 42B extend, i.e., a transverse plane of the intermediate portions 41B and 42B. Further, FIG. 4 is an enlarged view of a cut plane of the intermediate portion 41B of the inductor wiring 31 in the cross section of FIG. 3 and the resin layer 50 in contact with the intermediate portion 41B.

Figure 4:
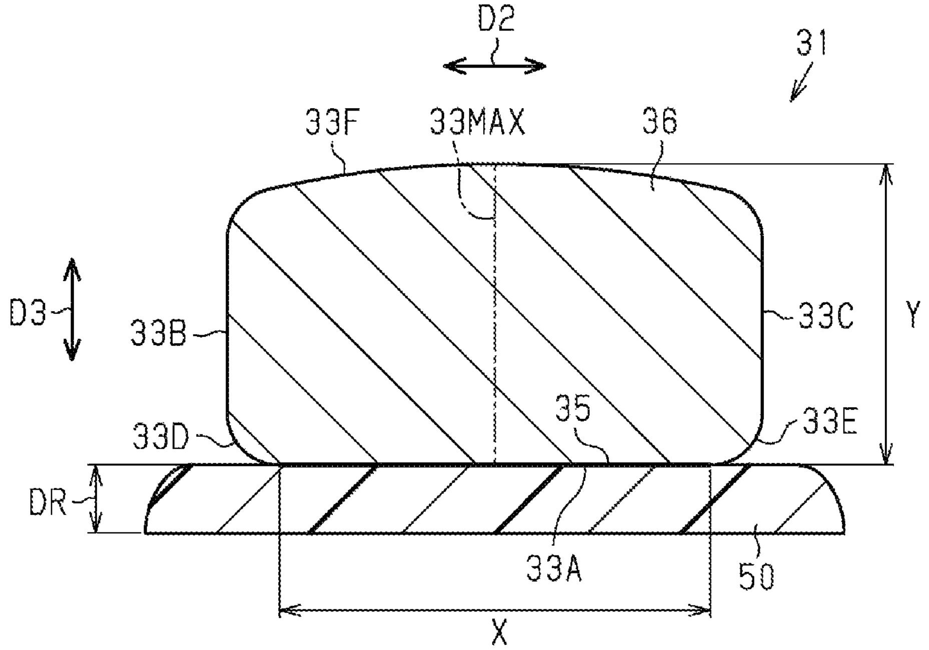
FIG. 4 is an enlarged view of a cut plane of an inductor wiring of the inductor component.

As illustrated in FIG. 3 and FIG. 4, the inductor wirings 31 and 32 have a contact surface 33A that is in contact with the resin layer 50. The inductor wirings 31 and 32 have a side wall surface 33B located on the first side relative to the contact surface 33A in the second direction D2, and a side wall surface 33C located on the second side relative to the contact surface 33A in the second direction D2. The side wall surface 33B is connected to the contact surface 33A via a connection portion 33D. Similarly, the side wall surface 33C is connected to the contact surface 33A via a connection portion 33E. The connection portion 33D and the connection portion 33E are not in contact with the resin layer 50, respectively. Further, the inductor wirings 31 and 32 have an upper wall surface 33F that is further away from the resin layer 50 than the contact surface 33A in the third direction D3 and is connected to the pair of side wall surfaces 33B and 33C.

In the cut plane illustrated in FIG. 4, the upper wall surface 33F has a substantially convex shape in a direction away from the resin layer 50. In such a cut plane, a portion where a dimension from the contact surface 33A to the upper wall surface 33F in the third direction D3 is the largest is referred to as a maximum site 33MAX.

Incidentally, as illustrated in FIG. 4, the inductor wirings 31 and 32 include a seed layer 35 and a conductive layer 36. The seed layer 35 and the conductive layer 36 are each made of a conductive material. The seed layer 35 is in contact with the resin layer 50. The conductive layer 36 is located on a side opposite to the resin layer 50 across the seed layer 35.

Next, the size of the inductor component 10 and the constituent elements of the inductor component 10 will be described.

As illustrated in FIG. 3, in a case where a dimension in the third direction D3 of the element body 20 is defined as a thickness DB of the element body 20, the element body 20 is configured to have the thickness DB of equal to or less than about "500 μm". That is, the inductor component 10 of the present embodiment is very thin.

As illustrated in FIG. 4, a maximum dimension in the third direction D3 of the resin layer 50 provided inside the element body 20 is defined as a thickness DR of the resin layer 50. In this case, the resin layer 50 is configured such that the thickness DR thereof is equal to or greater than about "5 μm" and equal to or less than about "30 μm" (i.e., from about "5 μm" to about "30 μm").

The inductor wirings 31 and 32 are configured so as to satisfy the following conditions. That is, the inductor wirings 31 and 32 are configured such that a configuration ratio Z is equal to or less than about "0.9" and equal to or greater than about "0.25" (i.e., from about "0.25" to about "0.9"). More preferably, the configuration ratio Z is set to be equal to or less than about "0.75". Note that the configuration ratio Z is a ratio of a dimension Y in the third direction D3 of a maximum site 33MAX with respect to a dimension X in the second direction D2 of the contact surface 33A in the transverse plane illustrated in FIG. 3 and FIG. 4. That is, in FIG. 3 and FIG. 4, the third direction D3 corresponds to the "height direction" perpendicular to the contact surface 33A, and the dimension Y in the third direction D3 of the maximum site 33MAX corresponds to a "maximum dimension" that is the largest dimension among the dimensions in the height direction in the transverse plane of the inductor wirings 31 and 32. Further, in FIG. 3 and FIG. 4, the second direction D2 corresponds to a dimension of the contact surface 33A in the transverse plane illustrated in FIG. 3 and FIG. 4.

Method for Manufacturing Inductor Component

Next, with reference to FIG. 5 to FIG. 13, a description will be given of a method for manufacturing the inductor component 10 described above. The manufacturing method according to the present embodiment is a method using a semi-additive method.

Figure 5:
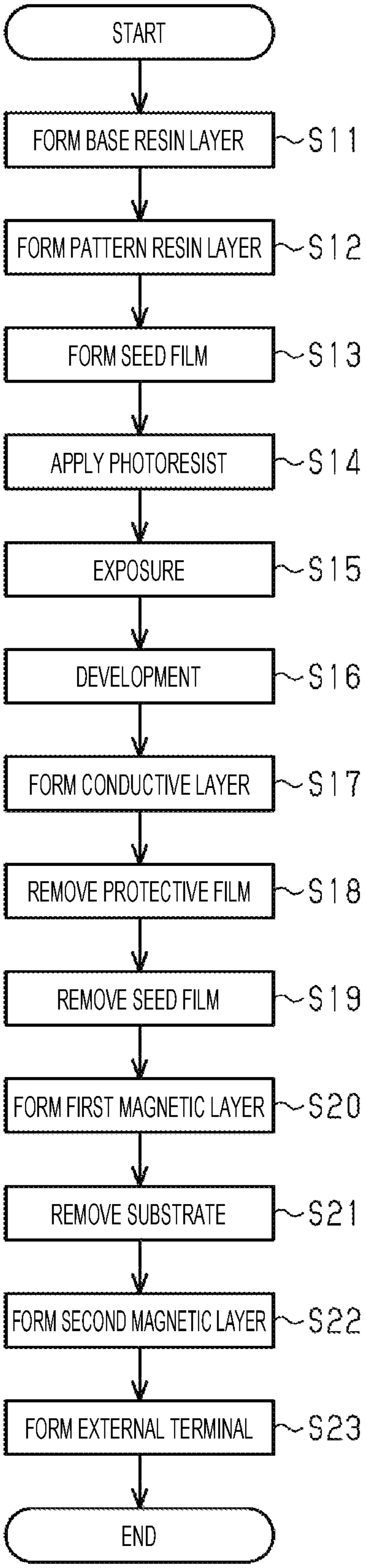
FIG. 5 is a flowchart explaining an embodiment of a method for manufacturing an inductor component.

As illustrated in FIG. 5, in a first step S11, a base resin layer is formed on a substrate.

Figure 6:
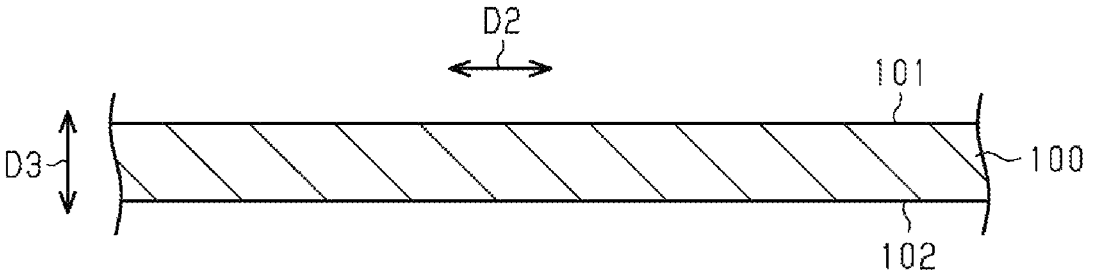
FIG. 6 is an explanatory diagram of the same manufacturing method.
Figure 7:
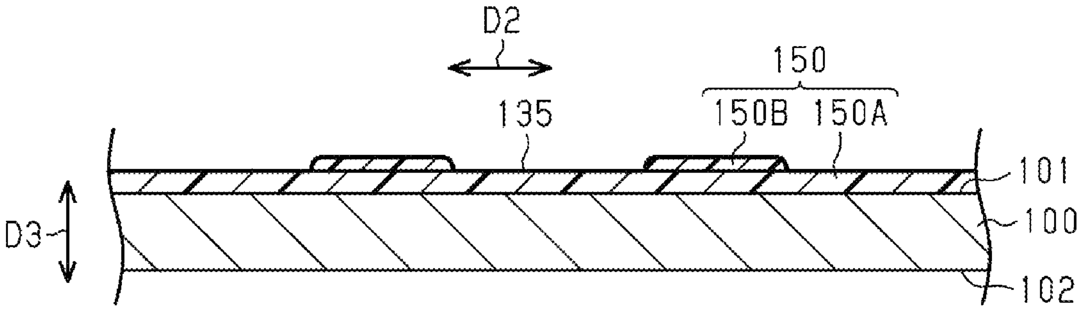
FIG. 7 is an explanatory diagram of the same manufacturing method.

That is, as illustrated in FIG. 6, a substrate 100 has a substantially plate-like shape. As a material of the substrate 100, for example, ceramics may be used. In FIG. 6, an upper surface of the substrate 100 is referred to as a front surface 101, and a lower surface of the substrate 100 is referred to as a back surface 102. As illustrated in FIG. 7, a base resin layer 150A is formed on the substrate 100 so as to cover the entire front surface 101 of the substrate 100. The base resin layer 150A is made of the same non-magnetic material as that of the resin layer 50 configuring the inductor component 10. For example, the base resin layer 150A can be formed by applying a polyimide varnish including a trifluoromethyl group and a silsesquioxane to the front surface 101 of the substrate 100 by spin coating.

When the formation of the base resin layer 150A is completed, the processing proceeds to a next step S12. In step S12, a pattern resin layer 150B is formed on the base resin layer 150A. At least an upper portion of the pattern resin layer 150B in FIG. 7 configures the resin layer 50 of the inductor component 10. For example, the pattern resin layer 150B can be formed by patterning a non-magnetic insulating resin on the base resin layer 150A by known photolithography. In this case, a polyimide varnish of the same kind as that used for forming the base resin layer 150A is used, and the pattern resin layer 150B is formed. That is, in the present embodiment, a "resin layer forming process" of forming the resin layer 150 made up of the base resin layer 150A and the pattern resin layer 150B on the substrate 100 is configured by steps S11 and S12.

When the formation of the pattern resin layer 150B is completed, the processing proceeds to a next step S13. In step S13, a seed film 135 is formed. That is, as illustrated in FIG. 7, the seed film 135 is formed so as to cover the entire upper surface of the resin layer 150 in the figure. For example, the seed film 135 containing copper is formed by sputtering. Of the portion of the seed film 135 like this, a portion located on the pattern resin layer 150B functions as the seed layer 35 configuring the inductor wirings 31 and 32 of the inductor component 10. For example, in step S13, the seed film 135 having a thickness of about "200 nm" is formed. Therefore, in the present embodiment, step S13 corresponds to a "seed film forming process" in which the seed film 135 is formed on the resin layer 150.

When the formation of the seed film 135 is completed, the processing proceeds to a next step S14. In step S14, a photoresist is applied to the seed film 135 over the entire seed film 135. For example, a photoresist is applied by spin coating. Then, in a next step S15, exposure using an exposure device is performed. As a result, the portion of the photoresist that is adhered to the pattern resin layer 150B can be removed, and the other portion is cured.

Figure 8:
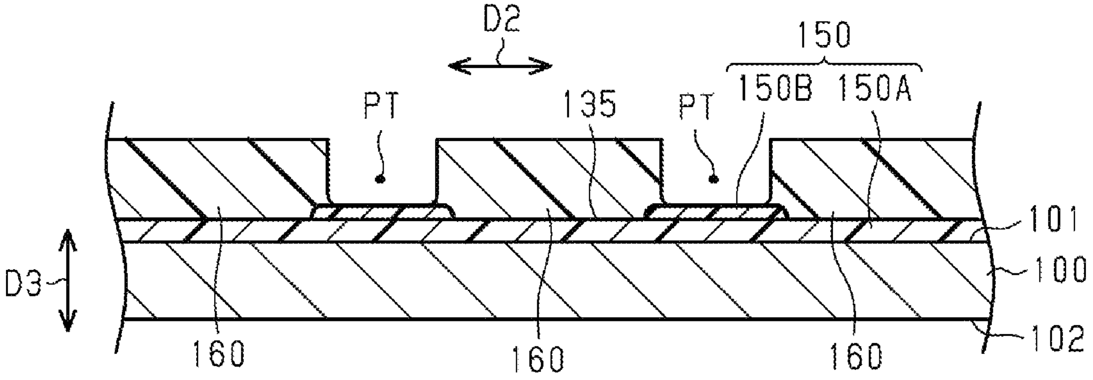
FIG. 8 is an explanatory diagram of the same manufacturing method.

Subsequently, in step S16, development processing is performed. That is, as illustrated in FIG. 8, a portion of the photoresist that is adhered to the pattern resin layer 150B is removed by the processing using a developer. In addition, a cured portion of the photoresist remains on the seed film 135 as the protective film 160. By patterning the protective film 160 on the seed film 135 as described above, a wiring pattern PT in which a shape of the inductor wirings 31 and 32 in the inductor component 10 is opened is formed. Therefore, in the present embodiment, a "pattern forming process" is configured by steps S14 to S16.

When the formation of the wiring pattern PT is completed, the processing proceeds to a next step S17. In step S17, a conductive layer 36 is formed by supplying a conductive material into the wiring pattern PT. That is, the conductive layer 36 is formed on a portion of the seed film 135 that is not covered with the protective film 160. For example, by performing electrolytic copper plating using a copper sulfate aqueous solution, copper and a trace amount of sulfur are mainly precipitated in an exposed portion of the seed film 135. Thereby, the conductive layer 36 is formed. Since the copper sulfate aqueous solution is used, the conductive layer 36 contains sulfur. The inductor wirings 31 and 32 are formed by the seed layer 35, which is a portion of the seed film 135 that is in contact with the conductive layer 36, and the conductive layer 36. Therefore, in the present embodiment, step S17 corresponds to a "conductive layer forming process".

Figure 9:
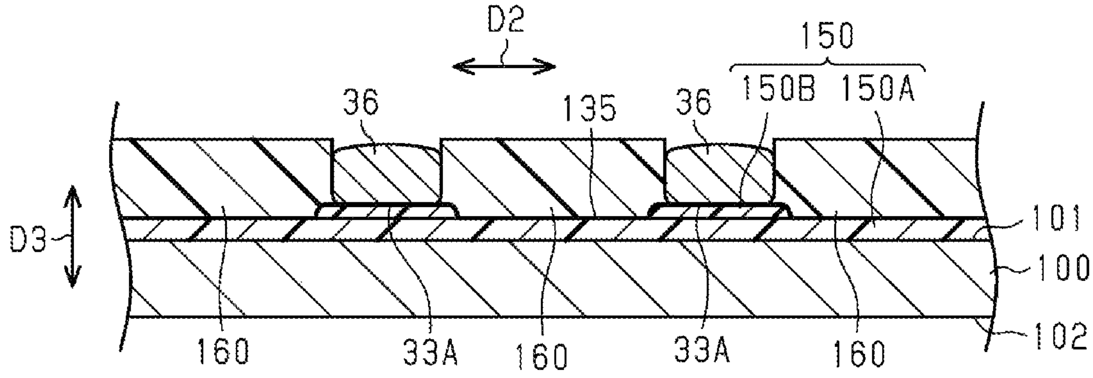
FIG. 9 is an explanatory diagram of the same manufacturing method.

As illustrated in FIG. 9, a lower surface of the seed film 135 located on the pattern resin layer 150B in the figure corresponds to the contact surface 33A of the inductor wirings 31 and 32. Then, in step S17, the conductive layer 36 is formed such that the above described configuration ratio Z is equal to or less than about "0.9" and equal to or greater than about "0.25" (i.e., from about "0.25" to about "0.9"). More preferably, the conductive layer 36 is formed such that the configuration ratio Z is equal to or less than about "0.75". For example, a predetermined configuration ratio Z may be obtained by an energization time of the electrolytic copper plating.

Figure 10:
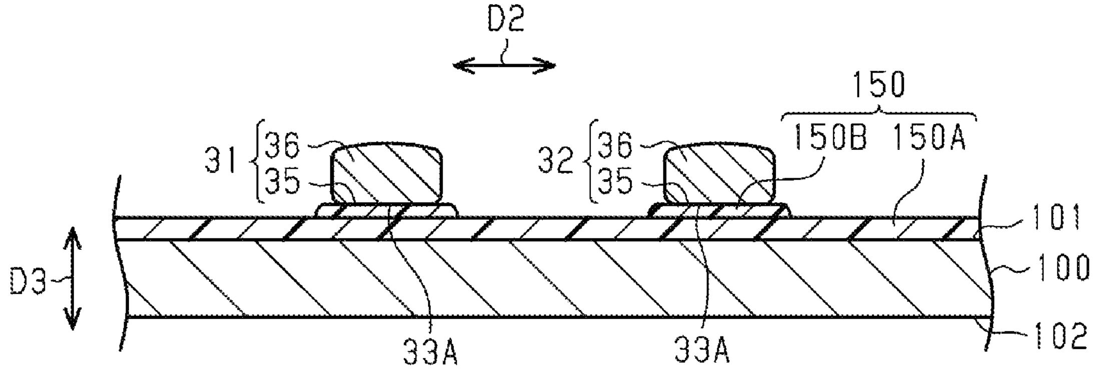
FIG. 10 is an explanatory diagram of the same manufacturing method.

When the formation of the conductive layer 36 is completed, the process proceeds to a next step S18. In step S18, the protective film 160 is removed as illustrated in FIG. 10 by processing using a stripping solution. Therefore, in the present embodiment, step S18 corresponds to a "protective film removing process".

When the peeling of the protective film 160 is completed, the processing proceeds to a next step S19. In step S19, the seed film 135 is removed. For example, the seed film 135 is removed by processing using strong acid such as nitric acid. As a result, a portion of the seed film 135 that is a portion other than the seed layer 35 configuring the inductor wirings 31 and 32 together with the conductive layer 36 is removed.

Figure 11:
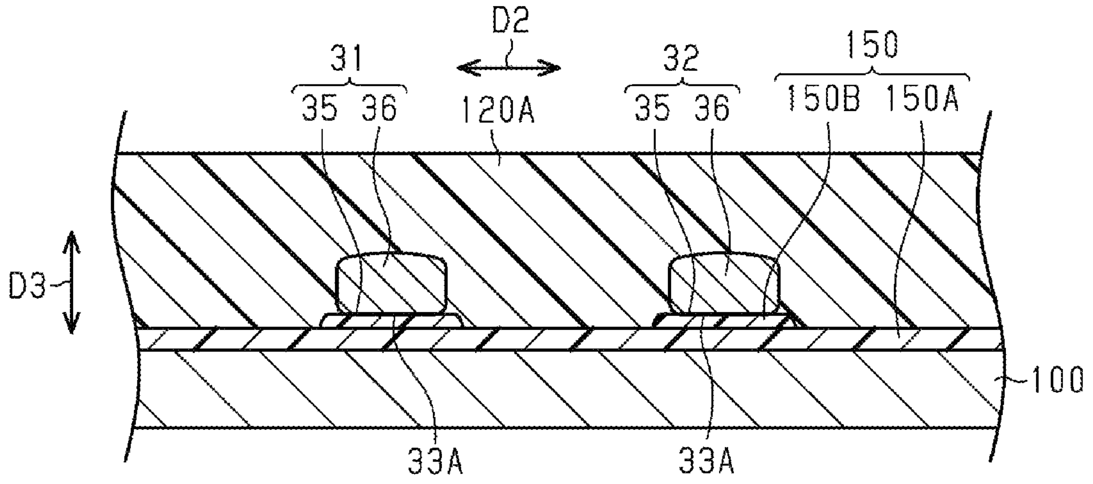
FIG. 11 is an explanatory diagram of the same manufacturing method.

When the removal of the seed film 135 is completed, the processing proceeds to a next step S20. In step S20, as illustrated in FIG. 11, a first magnetic layer 120A covering the conductive layer 36 is formed from an upper surface side in the figure. That is, a resin containing a metal magnetic powder that is a material of the first magnetic layer 120A is applied. Examples of the metal magnetic powder include iron, nickel, chromium, copper, and aluminum. Further, as the resin containing a metal magnetic powder, a resin material such as an epoxy resin may be used. In consideration of insulation properties and moldability, it is preferable to employ a polyimide resin, an acrylic resin, and a phenol resin as a resin containing a metal magnetic powder. Subsequently, the resin containing the metal magnetic powder is solidified by press working. As a result, the first magnetic layer 120A is formed.

Note that, in a case where the substantially columnar wirings 15 to 18 are provided as in the inductor component 10 described above, the substantially columnar wirings 15 to 18 are formed before the first magnetic layer 120A is formed. Then, in the processing of forming the first magnetic layer 120A, the formed first magnetic layer 120A is ground such that ends on sides not contacting with the inductor wirings 31 and 32 are exposed in the both ends of substantially columnar wiring 15 to 18. The first magnetic layer 120A may be a single layer, or may be a layer in which a plurality of magnetic layers is stacked in order to achieve a predetermined thickness.

When the formation of the first magnetic layer 120A is completed, the processing proceeds to a next step S21. In step S21, as illustrated in FIG. 12, the substrate 100 and the base resin layer 150A are removed by grinding. At this time, a part of the pattern resin layer 150B or the entire pattern resin layer 150B may be removed.

When the processing of the removal is completed, the processing proceeds to a next step S22. In step S22, as illustrated in FIG. 13, a second magnetic layer 120B is formed on the opposite side of the first magnetic layer 120A in the third direction D3. That is, a resin containing a metal magnetic powder that is a material of the second magnetic layer 120B is applied. Subsequently, the resin containing the metal magnetic powder is solidified by press working. The resin is ground as needed. As a result, the second magnetic layer 120B is formed. The second magnetic layer 120B may be a single layer, or may be a layer in which a plurality of magnetic layers is stacked to achieve a predetermined thickness. When the second magnetic layer 120B is formed as described above, the inductor wirings 31 and 32 are sandwiched between the first magnetic layer 120A and the second magnetic layer 120B. The element body 20 is configured by these first magnetic layer 120A and the second magnetic layer 120B. Therefore, in the present embodiment, an "element body forming process" of forming the element body 20 inside which the inductor wirings 31 and 32 are provided is configured by steps S20 to S22.

When the formation of the second magnetic layer 120B is completed, the processing proceeds to a next step S23. In step S23, the external terminals 11 to 14 are formed. At this time, an insulating film, such as a solder resist, for exposing the external terminals 11 to 14 may be formed on the first main surface 21 of the element body 20. Accordingly, a series of processing for configuring the manufacturing method of the inductor component 10 is terminated.

Examples

Next, referring to FIG. 14, a description will be made of a comparison between an inductor component of a comparative example and the inductor component 10 of an example. The inductor component of the comparative example and the inductor component 10 of the example differ in the configuration ratio Z by changing the dimension X in the second direction D2 and the dimension Y in the third direction D3 illustrated in FIG. 14, and the other configurations are the same.

In FIG. 14, the configuration ratio Z of the inductor component of Comparative Example 1 is "0.95". The configuration ratio Z of the inductor component of Comparative Example 2 is "0.92". On the other hand, the configuration ratio Z of the inductor component 10 of Example 1 is "0.90". The configuration ratio Z of the inductor component 10 of Example 2 is "0.84". The configuration ratio Z of the inductor component 10 of Example 3 is "0.79". The configuration ratio Z of the inductor component 10 of Example 4 is "0.75". The configuration ratio Z of the inductor component 10 of Example 5 is "0.49". The configuration ratio Z of the inductor component 10 of Example 6 is "0.25".

A deviation occurrence rate R illustrated in FIG. 14 is a probability that a deviation occurs between an actual position and a design position in the second direction D2 of the inductor wirings 31 and 32 after the inductor component 10 is completed. The design position refers to the position of the inductor wirings 31 and 32 defined by the design. In a case where the inductor component 10 is manufactured in a large amount by the above-described manufacturing method, the higher the deviation occurrence rate R, the lower a yield rate of the inductor component 10 is.

As illustrated in FIG. 14, in Comparative Examples 1 and 2, since the configuration ratio Z is larger than about "0.9", the deviation occurrence rate R is high. On the other hand, in Examples 1 to 6, since the configuration ratio Z is equal to or less than about "0.9", the deviation occurrence rate R is low. In particular, in Examples 4 to 6, since the configuration ratio Z is equal to or less than about "0.75", the deviation occurrence rate R becomes about "0.0%".

The reason why the deviation occurrence rate R can be reduced by setting the configuration ratio Z to be equal to or less than about "0.9" will be described. The inductor wirings 31 and 32 extend generally in the first direction D1. In the process of manufacturing the inductor component 10, as illustrated in FIG. 9, the protective film 160 formed of a photoresist is disposed on both sides in the second direction D2 of the conductive layer 36 configuring the inductor wirings 31 and 32. Then, in a case where the protective film 160 is removed using the stripping solution, the protective film 160 is swelled by the stripping solution. That is, the protective film 160 tends to spread in the second direction D2. Then, the conductive layer 36 adjacent to the protective film 160 is pressed by the protective film 160. That is, due to the swelling of the protective film 160, a displacement force, which is a force for displacing the inductor wirings 31 and 32 in the second direction D2, acts on the inductor wirings 31 and 32 including the conductive layer 36.

On the other hand, the inductor wirings 31 and 32 are in close contact with the pattern resin layer 150B, i.e., the resin layer 50. Therefore, the close contact force, which is a force for retaining a positional relationship between the pattern resin layer 150B and the inductor wirings 31 and 32, is generated between the inductor wirings 31 and 32 and the pattern resin layer 150B.

When the close contact force is small with respect to the displacement force, the position of the inductor wirings 31 and 32 is displaced in the second direction D2 by the displacement force. On the other hand, when the close contact force is sufficiently large with respect to the displacement force, the position of the inductor wirings 31 and 32 is not displaced in the second direction D2 even when the displacement force acts.

As the dimension Y of the inductor wirings 31 and 32 in the third direction D3 is larger, the displacement force received by the inductor wirings 31 and 32 from the protective film 160 increases. On the other hand, as the dimension X of the contact surface 33A of the inductor wirings 31 and 32 in the second direction D2 increases, the close contact force generated between the inductor wirings 31 and 32 and the pattern resin layer 150B increases.

Incidentally, as the configuration ratio Z of the inductor wirings 31 and 32 is smaller, the dimension of the inductor wirings 31 and 32 in the third direction D3 can be reduced, and thus the displacement force received by the inductor wirings 31 and 32 from the protective film 160 can be reduced. Further, as the configuration ratio Z of the inductor wirings 31 and 32 is smaller, the dimension X of the contact surface 33A in the second direction D2 increases, and thus the close contact force generated between the inductor wirings 31 and 32 and the pattern resin layer 150B can be increased.

As illustrated in FIG. 14, in Comparative Examples 1 and 2, since the configuration ratio Z is large, the dimension of the inductor wirings 31 and 32 in the third direction D3 becomes large or the dimension X of the contact surface 33A in the second direction D2 becomes small. Therefore, the deviation occurrence rate R becomes large.

On the contrary, in Examples 1 to 6, since the configuration ratio Z is small, it is possible to suppress an increase of the dimension of the inductor wirings 31 and 32 in the third direction D3, and the dimension X in the second direction D2 of the contact surface 33A can be increased. That is, the close contact force generated between the inductor wirings 31 and 32 and the pattern resin layer 150B can be increased while the displacement force acting on the inductor wirings 31 and 32 is reduced. As a result, the deviation occurrence rate R can be reduced compared with the case of Comparative Examples 1 and 2. Therefore, it is possible to suppress a change in performance of the inductor component 10.

Further, by setting the configuration ratio Z to be equal to or less than about "0.75" as in Examples 4 to 6, the displacement force acting on the inductor wirings 31 and 32 can be further reduced, and the close contact force generated between the inductor wirings 31 and 32 and the pattern resin layer 150B can be further increased. As a result, the deviation occurrence rate R can be set to about "0.0%", and thus the effect of suppressing the change in the performance of the inductor component 10 can be increased.

In the present embodiment, the following effects can be further obtained.

The smaller the configuration ratio Z is, the smaller the thickness of the inductor wirings 31 and 32 is. Then, the thinner the inductor wirings 31 and 32 are, the higher the wiring resistance of the inductor wirings 31 and 32 is. The high wiring resistance of the inductor wirings 31 and 32 is not preferable as the inductor component 10. In this regard, in the present embodiment, the inductor wirings 31 and 32 are configured such that the configuration ratio Z is equal to or greater than about "0.25". Accordingly, it is possible to suppress becoming excessively large of the wiring resistance of the inductor wirings 31 and 32.

The above-described embodiments may be modified as follows. The above-described embodiments and the following modifications may be implemented in combination with each other within a scope that does not contradict the technical scope of the present disclosure.

The seed layer 35 may be a layer formed using a metal other than copper as a material. Examples of the other metals include titanium, silver, chromium, nickel, and the like.

In a case where the inductor component 10 is manufactured by a method different from the manufacturing method described in the above-described embodiment, the seed layer 35 is not essential.

The inductor component 10 does not have to be manufactured in one unit as in the manufacturing method described in the above embodiment, and portions to be a plurality of inductor components 10 may be disposed in a matrix form on the substrate 100, and may be singulated by dicing or the like in step S23 and subsequent steps.

The inductor wiring provided inside the element body 20 may have a shape different from the shape described in the above-described embodiment. A structure, a shape, a material, and the like of the inductor wiring are not particularly limited as long as the inductor wiring can provide an inductance to the inductor component 10 by generating magnetic flux around the inductor wiring when a current flows therethrough. The inductor wiring may be a wire having various known wiring shapes, such as a spiral shape of equal to or more than one turn, a curved shape of less than 1.0 turn, or a meandering meander shape.

In the above embodiment, two inductor wirings 31 and 32 are provided inside the element body 20. However, the number of the inductor wirings provided inside the element body 20 may be a number other than "2". For example, in the inductor component 10, equal to or more than three inductor wirings may be provided in the element body 20, or one inductor wirings may be provided in the element body 20.

The first direction D1 and the second direction D2 may be different from the directions illustrated in FIG. 1 as long as they are directions along the first main surface 21.

The resin layer 50 may contain a filler such as silica or barium sulfate, or may be a resin layer having magnetism.

The element body 20 may contain a magnetic powder such as ferrite in place of or in addition to the metal magnetic powder.

The inductor component 10 may be manufactured by another manufacturing method that does not utilize a semi-additive method. For example, the inductor component 10 may be formed by a sheet lamination method, a printing lamination method, or the like, and the inductor wirings 31 and 32 may be formed by a thin film method such as sputtering, vapor deposition, or the like, a thick film method such as printing and coating, or a plating method such as a full additive method, a subtractive method, or the like. Even in this case, the inductor wirings 31 and 32 may receive the displacement force from the members located on both sides in the second direction D2 of the inductor wirings 31 and 32 in the manufacturing process or after manufacturing, in some cases. At this time, by setting the configuration ratio Z to be equal to or less than about "0.9", it is possible to suppress an increase in the displacement force while increasing the close contact force. Therefore, in the inductor component 10, it is possible to suppress the occurrence of a deviation between the position of the inductor wirings 31 and 32 and the design position inside the element body 20, regardless of the manufacturing method.

According to the inductor component and the method for manufacturing the inductor component, it is possible to suppress the deviation between the position of the inductor wiring and the design position inside the element body.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. An inductor component comprising:

an element body having magnetism;

a resin layer provided inside the element body; and an inductor wiring provided inside the element body and having a first contact surface that is in contact with the resin layer, and the inductor wiring comprises a conductive layer and a seed layer that is present between the conductive layer and the resin layer, the first contact surface is a surface of the seed layer that contacts the resin layer, and a width of the conductive layer is greater than a width of the first contact surface, wherein the conductive layer has a second contact surface, which is a lowermost surface of the conductive layer that contacts and extends across the seed layer from a first end of the seed layer to a second end of the seed layer, opposite side surfaces, connection portions including opposite curved surfaces which respectively extend from the opposite side surfaces to the second contact surface, and an upper wall surface having opposite curved ends respectively extending to the opposite side surfaces, and the upper wall surface has a convex portion extending between the opposite curved ends and having a convex shape in a direction away from the resin layer, and wherein in a transverse plane of the inductor wiring orthogonal to a direction in which the inductor wiring extends, in a case where a largest dimension among dimensions in a height direction perpendicular to the first contact surface is defined as a maximum dimension, a configuration ratio that is a ratio of the maximum dimension to a dimension of the first contact surface in the transverse plane is equal to or less than 0.9.

2. The inductor component according to claim 1, wherein the configuration ratio is equal to or less than 0.75.

3. The inductor component according to claim 1, wherein the configuration ratio is equal to or greater than 0.25.

4. The inductor component according to claim 1, wherein the resin layer is non-magnetic.

5. The inductor component according to claim 1, wherein the resin layer contains fluorine.

6. The inductor component according to claim 5, wherein the resin layer contains a trifluoromethyl group.

7. The inductor component according to claim 5, wherein in the resin layer, a content rate of fluorine in a portion close to the inductor wiring is higher than a content rate of fluorine in a portion away from the inductor wiring.

8. The inductor component according to claim 1, wherein the resin layer contains silicon.

9. The inductor component according to claim 8, wherein the resin layer contains silsesquioxane.

10. The inductor component according to claim 1, wherein a dimension of the resin layer in the height direction is from 5 μm to 30 μm.

11. The inductor component according to claim 1, wherein a dimension in the height direction of the element body is equal to or less than 500 μm.

12. The inductor component according to claim 1, wherein the conductive layer is disposed opposite to the resin layer across the seed layer and has conductivity.

13. The inductor component according to claim 1, wherein the inductor wiring contains sulfur of from 0.01 atomic % to 1 atomic %.

14. The inductor component according to claim 2, wherein the configuration ratio is equal to or greater than 0.25.

15. The inductor component according to claim 2, wherein the resin layer is non-magnetic.

16. The inductor component according to claim 2, wherein the resin layer contains fluorine.

17. The inductor component according to claim 6, wherein in the resin layer, a content rate of fluorine in a portion close to the inductor wiring is higher than a content rate of fluorine in a portion away from the inductor wiring.

18. The inductor component according to claim 2, wherein the resin layer contains silicon.

19. The inductor component according to claim 2, wherein a dimension of the resin layer in the height direction is from 5 μm to 30 μm.

* * * * *